United States Patent [19]

Goetz

[11] Patent Number: 5,468,015

[45] Date of Patent: Nov. 21, 1995

[54] APPARATUS FOR INFLATING AN INFLATABLE VEHICLE OCCUPANT RESTRAINT

[75] Inventor: George W. Goetz, Rochester, Mich.

[73] Assignee: TRW Vehicle Safety Systems Inc., Lyndhurst, Ohio

[21] Appl. No.: 263,149

[22] Filed: Jun. 21, 1994

[51] Int. Cl.$^6$ ........................................................ B60R 21/26
[52] U.S. Cl. ................................................ 280/737; 280/742
[58] Field of Search .................................. 280/736, 737, 280/741, 742

[56] References Cited

U.S. PATENT DOCUMENTS

| | | | |
|---|---|---|---|
| 3,180,373 | 4/1965 | Hebenstreit | 141/4 |
| 3,733,180 | 5/1973 | Heineck et al. | 422/167 |
| 3,743,318 | 7/1973 | Yamaguchi et al. | 280/737 |
| 3,862,866 | 1/1975 | Timmerman et al. | 149/21 |
| 3,895,821 | 7/1975 | Schotthoefer et al. | 280/737 |
| 5,076,607 | 12/1991 | Woods et al. | 280/737 |
| 5,213,362 | 5/1993 | Coultas | 280/736 |
| 5,242,194 | 9/1993 | Popek | 280/737 |
| 5,263,740 | 11/1993 | Frey et al. | 280/737 |

*Primary Examiner*—Kenneth R. Rice
*Attorney, Agent, or Firm*—Tarolli, Sundheim & Covell

[57] ABSTRACT

An apparatus (10) for use in inflating an inflatable vehicle occupant restraint (12) includes a pressure vessel (14), an actuator assembly (16), and a diffuser (20). The pressure vessel (14) defines a closed storage chamber (18) containing inflation fluid. The actuator assembly (16) opens the storage chamber (18) to release the inflation fluid from the storage chamber (18), and includes a charge of pyrotechnic material (100). The diffuser (20) directs the inflation fluid from the pressure vessel (14) into the vehicle occupant restraint (12) to inflate the vehicle occupant restraint (12). The apparatus (10) further includes a body (160) of combustible material which emits combustion products into the inflation fluid to increase the volume of the inflation fluid at a location outside of the storage chamber (18) by heating the inflation fluid outside of the storage chamber (18). The body (160) of combustible material is located outside of the storage chamber (18) between the storage chamber (18) and the vehicle occupant restraint (12).

22 Claims, 2 Drawing Sheets

APPARATUS FOR INFLATING AN INFLATABLE VEHICLE OCCUPANT RESTRAINT

FIELD OF THE INVENTION

The present invention relates to an apparatus for inflating an inflatable vehicle occupant restraint such as an air bag.

BACKGROUND OF THE INVENTION

U.S. Pat. No. 5,242,194 to Popek discloses an apparatus for inflating an inflatable vehicle occupant restraint such as an air bag. The apparatus includes a container and an actuator assembly. The container defines a cylindrical storage chamber containing gas under pressure, and has a burst disk which closes the storage chamber. A body of pyrotechnic material is contained in the storage chamber with the gas. The actuator assembly includes a piston, a charge of pyrotechnic material, and a squib for igniting the charge of pyrotechnic material.

When the vehicle experiences deceleration of at least a predetermined amount which indicates the occurrence of a vehicle collision, the charge of pyrotechnic material in the actuator assembly is ignited by the squib. The charge of pyrotechnic material then generates combustion products which propel the piston forcefully against the burst disk to rupture the burst disk. The gas in the storage chamber is thus released to exit the storage chamber through an opening defined by the ruptured burst disk. A diffuser then directs the gas into the air bag to inflate the air bag.

Additionally, the combustion products generated by the charge of pyrotechnic material are directed into the storage chamber through a passage extending through the piston. The combustion products are thus directed against the body of pyrotechnic material in the storage chamber to ignite the body of pyrotechnic material. When the body of pyrotechnic material burns in the storage chamber, it generates additional combustion products which increase the gas pressure in the storage chamber by heating the stored gas and by generating additional gas. As a result, the apparatus provides gas for inflating the air bag at an elevated pressure level which is greater than the pressure level at which the gas is originally contained in the storage chamber.

A similar apparatus for inflating an inflatable vehicle occupant restraint is disclosed in co-pending U.S. patent application Ser. No. 135,786, filed Oct. 13, 1993, entitled "A Vehicle Occupant Restraint Inflator," and assigned to TRW Vehicle Safety Systems Inc. In that apparatus, the storage chamber contains a mixture of gases. The mixture of gases includes a primary gas for inflating the vehicle occupant restraint, and further includes a combustible gas. The apparatus also includes a charge of pyrotechnic material for generating combustion products that propel a piston forcefully against a burst disk which closes the storage chamber. The piston then ruptures the burst disk to open the storage chamber, and also directs the combustion products from the charge of pyrotechnic material into the mixture of gases in the storage chamber. The combustible gas in the mixture of gasses is thus ignited and, as a result, the mixture of gases is heated and pressurized.

SUMMARY OF THE INVENTION

In accordance with the present invention, an apparatus for use in inflating an inflatable vehicle occupant restraint, such as an air bag, comprises a pressure vessel means, an actuator means, and a directing means. The pressure vessel means defines a closed storage chamber containing inflation fluid. The actuator means opens the storage chamber to release the inflation fluid from the storage chamber, and includes a charge of pyrotechnic material. The directing means directs the inflation fluid from the pressure vessel means into the vehicle occupant restraint to inflate the vehicle occupant restraint.

The apparatus further includes a heating means for increasing the volume of the inflation fluid at a location outside of the storage chamber by heating the inflation fluid outside of the storage chamber. The heating means includes a body of combustible material which, when ignited, emits combustion products into the inflation fluid. The body of combustible material is located outside of the storage chamber between the storage chamber and the vehicle occupant restraint.

As an advantage over the prior art, the walls of the pressure vessel means constructed in accordance with the present invention can be substantially thinner than the walls of similar pressure vessel structures that are known in the prior art. This is because the inflation fluid is heated and expanded to an increased volume outside of the storage chamber in accordance with the present invention. Therefore, the walls of the pressure vessel can be substantially thinner than they would otherwise have to be if the pressure vessel were required to contain the inflation fluid while it is being heated. The weight of the apparatus is proportionately less as a result of this feature of the present invention.

In a preferred embodiment of the present invention, the body of combustible material has a cylindrical inner surface which defines a passage extending through the body of combustible material. The passage defines a portion of a fluid flow path which extends from the storage chamber to the inflatable vehicle occupant restraint. The body of combustible material thus defines a nozzle for directing the inflation fluid from the storage chamber toward the vehicle occupant restraint. The cross-sectional flow area of the passage in the nozzle increases as the body of combustible material is consumed by combustion. Since the fluid pressure in the storage chamber decreases as the inflation fluid flows outward from the storage chamber, the increasing cross-sectional flow area in the nozzle enables the decreasing fluid pressure to sustain a desired flow rate outward from the storage chamber.

BRIEF DESCRIPTION OF THE DRAWINGS

The foregoing and other features of the present invention will become apparent to those skilled in the art to which the present invention relates upon reading the following description with reference to the accompanying drawings, in which.

DESCRIPTION OF A PREFERRED EMBODIMENT

Figure 1:
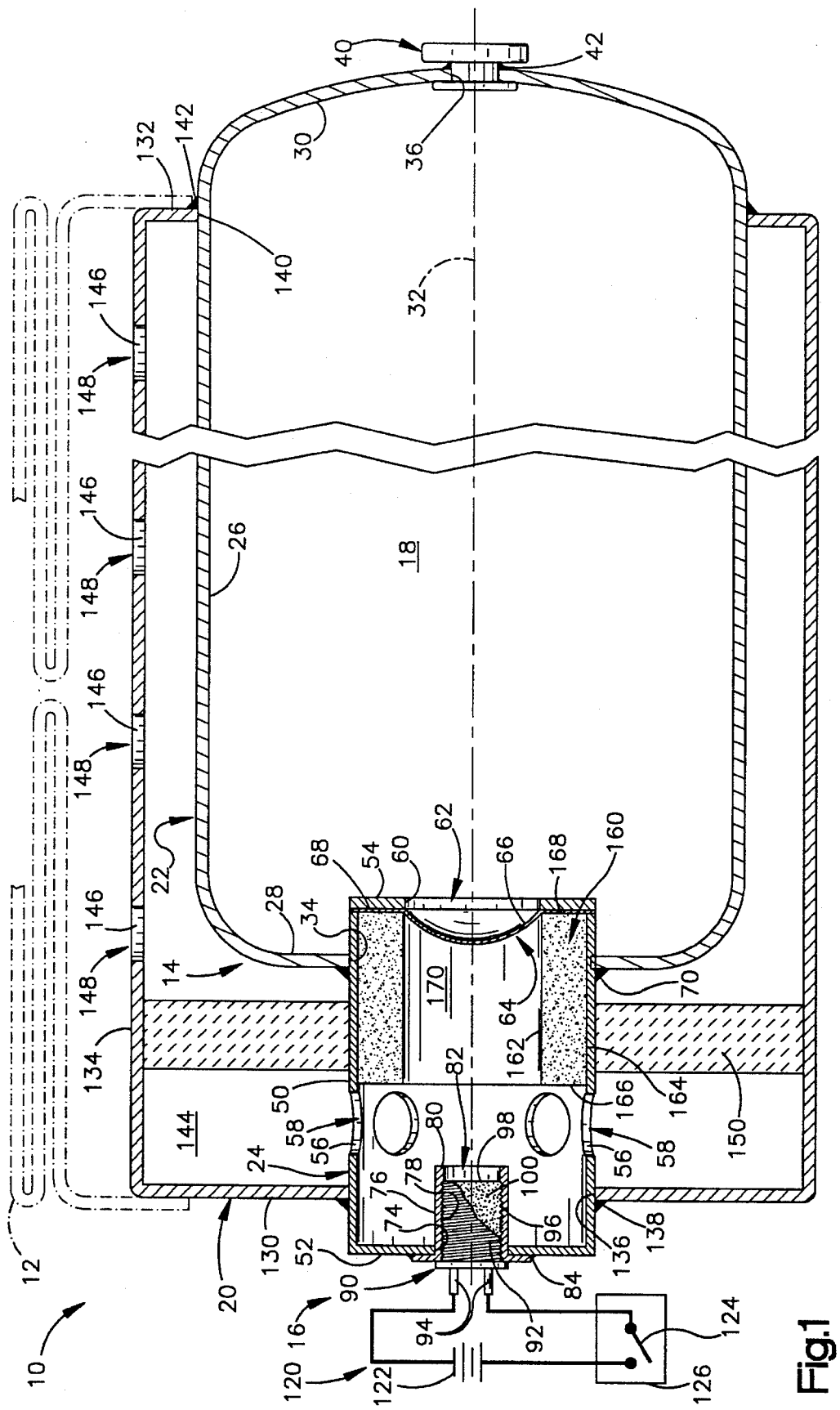
FIG. 1 is a schematic view of a vehicle occupant restraint apparatus comprising a preferred embodiment of the present invention.
Figure 2:
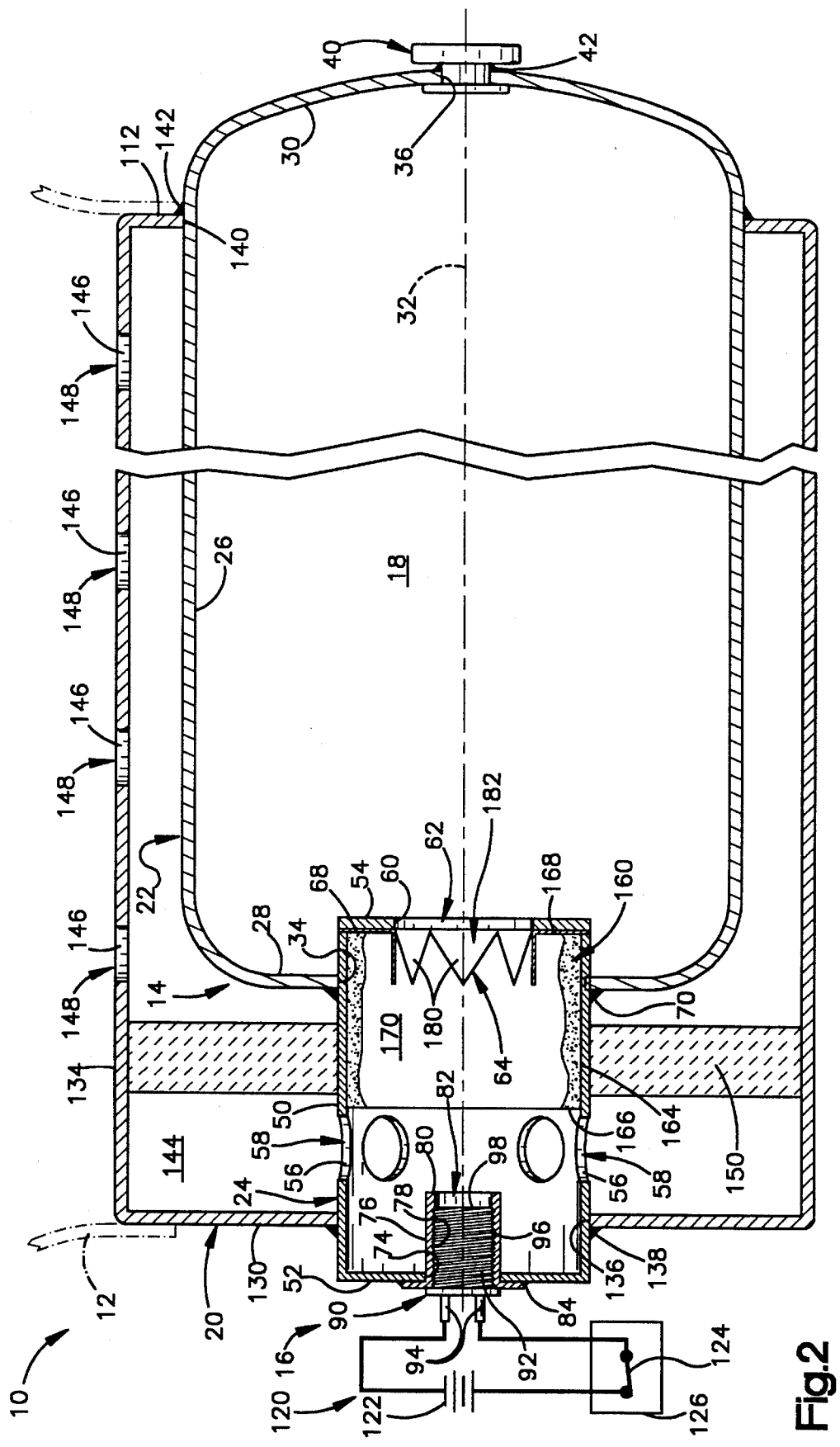
FIG. 2 is a schematic view showing the apparatus of FIG. 1 in an actuated condition.

A vehicle occupant restraint apparatus 10 comprising a preferred embodiment of the present invention is shown schematically in FIGS. 1 and 2. The apparatus 10 includes an inflatable vehicle occupant restraint 12, which is commonly referred to as an air bag. The apparatus 10 has an unactuated condition in which the air bag 12 is stored in a folded condition, as indicated in FIG. 1. The apparatus 10 also has an actuated condition in which the air bag 12 is inflated, as indicated in FIG. 2. When the vehicle experiences deceleration of at least a predetermined amount which indicates the occurrence of a vehicle collision, the apparatus 10 is actuated. The air bag 12 is then inflated from the stored, folded condition to the inflated condition. When the air bag 12 is inflated, it extends into the vehicle occupant compartment (not shown) to restrain an occupant of the vehicle from forcefully striking parts of the vehicle.

The apparatus 10 further includes a pressure vessel 14 and an actuator assembly 16. The pressure vessel 14 has a sealed storage chamber 18 which contains inflation fluid under pressure. The inflation fluid contained in the storage chamber 18 is preferably not combustible, and most preferably consists essentially of a mixture of argon and oxygen. The actuator assembly 16 opens the storage chamber 18 to release the inflation fluid from the storage chamber 18 when the apparatus 10 is actuated. A diffuser 20 then directs the inflation fluid from the pressure vessel 14 into the air bag 12 to inflate the air bag 12.

The pressure vessel 14 includes a container 22 and a manifold 24. The container 22 has a cylindrical side wall 26, a first circular end wall 28, and a second circular end wall 30, each of which is centered on a longitudinal central axis 32. The first end wall 28 of the container 22 has an annular inner edge surface 34 which defines a circular opening at the center of the first end wall 28. The second end wall 28 of the container 22 similarly has an annular inner edge surface 36 which defines a circular opening at the center of the second end wall 30.

An end cap 40 of known construction is closely received through the opening in the second end wall 30 of the container 22. The end cap 40 has a passage (not shown) through which the inflation fluid is conducted into the storage chamber 18. When the storage chamber 18 has been filled with inflation fluid at a desired pressure, the passage in the end cap 40 is closed. The end cap 40 may also include a conventional pressure switch which monitors the fluid pressure in the storage chamber 18 to alert an occupant of the vehicle if the fluid pressure drops below a predetermined level. A weld 42 blocks leakage of the inflation fluid from the storage chamber 18 between the end cap 40 and the second end wall 30 of the container 22.

The manifold 24 has a cylindrical side wall 50, a first circular end wall 52, and a second circular end wall 54, each of which is centered on the axis 32. The cylindrical side wall 50 of the manifold 24 is closely received through the opening in the first end wall 28 of the container 22, and extends slightly into the storage chamber 18. A plurality of inner edge surfaces 56 of the cylindrical side wall 50 are located outside of the storage chamber 18. The inner edge surfaces 56 define a circumferentially extending array of fluid flow openings 58 which extend radially through the cylindrical side wall 50.

The second end wall 54 of the manifold 24 has an annular inner edge surface 60 which defines a circular exit opening 62 at the center of the second end wall 54. A metal burst disk 64 adjoins the second end wall 54. The burst disk 64 has a bulged central portion 66 and a flat annular rim portion 68. The central portion 66 of the burst disk 64 extends over the exit opening 62. The rim portion 68 of the burst disk 64 is welded between the cylindrical side wall 50 and the second end wall 54 of the manifold 24. The burst disk 64 is thereby supported by the manifold 24 in a position to block the inflation fluid from flowing outward from the storage chamber 18 through the exit opening 62. The storage chamber 18 is thus defined within, and closed by, the container 22, the walls 50 and 54 of the manifold 24, and the burst disk 64. A weld 70 blocks leakage of the inflation fluid from the storage chamber 18 between the manifold 24 and the container 22.

The first end wall 52 of the manifold 24 has an annular inner edge surface 74 which defines a circular opening at the center of the first end wall 52. A cylindrical tubular sleeve 76 is closely received coaxially through the opening in the first end wall 52. The sleeve 76 has a threaded inner surface 78, and has an annular end surface 80. The annular end surface 80 defines a circular opening 82 which is centered on the axis 32. A weld 84 secures the sleeve 76 to the first end wall 52 of the manifold 24, and blocks leakage of the inflation fluid between the sleeve 76 and the first end wall 52.

The actuator assembly 16 includes a squib 90 of known construction. The squib 90 has a metal casing 92, and includes a pair of electrically conductive pins 94 which extend into the casing 92. The casing 92 has a threaded outer surface 96 engaged with the threaded inner surface 78 of the sleeve 76, and has a circular front end wall 98 facing the circular opening 82 in the sleeve 76. A charge 100 of pyrotechnic material is contained in the casing 92, and is ignited upon the passage of electric current through the squib 90 between the pins 94. The charge 100 of pyrotechnic material may have any suitable composition known in the art, and rapidly produces combustion products including heat and hot particles when ignited. The combustion products produced by the charge 100 of pyrotechnic material rupture the casing 92 at the front end wall 98 and emerge rapidly from the casing 92. The squib 90 thus spews the combustion products into the manifold 24 through the opening 82 in the sleeve 76 when the squib 90 is actuated.

The actuator assembly 16 further includes an electrical circuit 120 in which the squib 90 is connected. The electrical circuit 120 includes a power source 122, which is preferably the vehicle battery and/or a capacitor. The electrical circuit 120 further includes a normally open switch 124. The switch 124 is preferably part of a deceleration sensor 126 which senses vehicle deceleration. When the deceleration sensor 126 senses vehicle deceleration of at least a predetermined amount, it closes the switch 124 to complete the electrical circuit 120. The predetermined amount of deceleration is an amount which indicates the occurrence of a vehicle collision for which inflation of the air bag 12 is desired to restrain an occupant of the vehicle.

The diffuser 20 has a first end wall 130, a second end wall 132, and a cylindrical side wall 134 extending between the first and second end walls 130 and 132. An annular inner edge surface 136 of the first end wall 130 defines a circular opening at the center of the first end wall 130. The cylindrical side wall 50 of the manifold 24 is closely received through the opening in the first end wall 130, and extends slightly outward past the first end wall 130 along the axis 32. A weld 138 blocks leakage of the inflation fluid between the first end wall 130 and the cylindrical side wall 50. The second end wall 132 of the diffuser 20 has a narrow annular shape, and also has an annular inner edge surface 140 defining a central opening. The cylindrical side wall 26 of the container 22 is closely received through the opening in the second end wall 132 of the diffuser 20, and extends slightly outward past the second end wall 132 along the axis 32. A weld 142 blocks leakage of the inflation fluid between the second end wall 132 and the cylindrical side wall 26. An enclosed fluid flow space 144 is thus defined between the pressure vessel 14 and the diffuser 20. The fluid flow space 144 extends radially outward from the manifold 24, and further extends axially over a substantial length portion of the container 22. A plurality of inner edge surfaces 146 of the side wall 134 of the diffuser 20 define fluid outlet openings 148 which communicate the fluid flow space 144 with the interior of the air bag 12.

A combustion arrestor 150 is located in the fluid flow space 144 between the pressure vessel 14 and the diffuser 20. The combustion arrestor 150 is a disk-shaped member, and is received concentrically between the cylindrical side wall 50 of the manifold 24 and the cylindrical side wall 14 of the diffuser 20. Importantly, the combustion arrestor 150 extends completely across the fluid flow space 144 at a location axially between the fluid flow openings 58 in the manifold 24 and the fluid outlet openings 148 in the diffuser 20. The combustion arrestor 150 may be formed of stainless steel wool, stainless steel mesh, or any other suitable combustion barrier material known in the art.

The apparatus 10 further includes a body 160 of combustible material which, when ignited, produces combustion products for heating and increasing the volume of the inflation fluid. In the preferred embodiment of the present invention shown in the drawings, the body 160 of combustible material is supported by the pressure vessel 14 at a location outside of the storage chamber 18. Specifically, the body 160 of combustible material is contained inside the manifold 24 between the second end wall 54 and the fluid flow openings 58 in the cylindrical side wall 50.

The body 160 of combustible material has a tubular shape with cylindrical inner and outer surfaces 162 and 164, both of which are centered on the axis 32. The cylindrical outer surface 164 adjoins the cylindrical side wall 50 of the manifold 24. A first annular end surface 166 of the body 160 is closely spaced axially from the fluid flow openings 58. A second annular end surface 168 of the body 160 adjoins the flat annular rim portion 68 of the burst disk 64. The cylindrical inner surface 162 of the body 160 has a constant diameter which is substantially equal to the diameter of the bulged central portion 66 of the burst disk 64. The cylindrical inner surface 162 thus defines a cylindrical fluid flow passage 170 which extends through the body 160 of combustible material along the axis 32 from the central portion 66 of the burst disk 64 to a location closely spaced from the fluid flow openings 58. The body 160 of combustible material thus defines a nozzle for directing the inflation fluid to flow axially outward from the central portion 68 of the burst disk 64 toward the fluid flow openings 58.

The body 160 of combustible material is preferably formed entirely of magnesium. However, the combustible material of which the body 160 is formed may have any suitable composition which is readily ignitable and which rapidly produces combustion products including hot particles and a great amount of heat. A coating formed of an ignition-enhancing material may be applied to the surfaces of the body 160 to enhance ignition of the combustible material of which the body 160 is formed. Such ignition-enhancing materials are known in the art. Moreover, the body 160 of combustible material may have additional surfaces which increase the total ignitable surface area of the body 160, and which define recesses and/or passages that conduct combustion products over or through the body 160. The ignition and combustion of the body 160 of combustible material would be further enhanced accordingly.

As described above, the deceleration sensor 126 in the electrical circuit 120 senses the occurrence of a predetermined amount of vehicle deceleration indicative of a collision for which inflation of the air bag 12 is desired to restrain an occupant of the vehicle. The switch 124 in the deceleration sensor 126 is then closed to complete the electrical circuit 120, as shown in FIG. 2. Electric current then passes through the squib 90 between the connector pins 94, and the charge 100 of pyrotechnic material in the squib 90 is ignited. The squib 90 then spews combustion products into the manifold 24 through the opening 82 in the sleeve 76.

The combustion products that are spewed into the manifold 24 from the squib 90 move axially from the opening 82 in the sleeve 76 to the central portion 66 of the burst disk 64. Those combustion products quickly heat the central portion 66 of the burst disk 64 to an elevated temperature. This reduces the tensile strength of the central portion 66 of the burst disk 64 and, as a result, causes the central portion 66 of the burst disk 64 to rupture under the influence of the fluid pressure acting outward from the storage chamber 18. The central portion 66 of the burst disk 64 preferably has a plurality of radially extending score lines (not shown) defining petal-shaped sections 180 that are spread apart outwardly from the storage chamber 18 when the central portion 66 is ruptured, as shown in FIG. 2. The inflation fluid in the storage chamber 18 is thus released to flow outward through the exit opening 62 and further through an opening 182 defined by the ruptured central portion 66 of the burst disk 64.

When the inflation fluid is released to exit the storage chamber 18, the fluid pressure in the storage chamber 18 develops a rapid flow of the inflation fluid axially through the passage 170 in the manifold 24, and radially into the fluid flow space 144 through the fluid flow openings 58 in the manifold 24. The flow of inflation fluid continues through the combustion arrestor 150 and into the air bag 12 through the fluid outlet openings 148 to inflate the air bag 12.

In addition to rupturing the burst disk 64, the combustion products emerging from the squib 90 also move against the body 160 of combustible material and ignite the body 160 of combustible material. The resulting combustion of the body 160 of combustible material causes the body 160 to produce additional combustion products and to emit those combustion products into the inflation fluid flowing through the diffuser 24. Those combustion products increase the volume of the inflation fluid by heating the inflation fluid. As a result, the inflation fluid emerges from the manifold 24 at an elevated volumetric flow level which is substantially greater than the volumetric flow level at which it would otherwise emerge from the storage chamber 18.

The inflation fluid continues to be heated and expanded to an increased volume as it flows through the fluid flow space 144 from the fluid flow openings 58 to the combustion arrestor 150. The combustion arrestor 150 is permeable enough to permit the inflation fluid to flow through the combustion arrestor 150 at a high flow rate, but blocks the propagation of combustion. The combustion arrestor 150 thereby blocks the propagation of combustion through the fluid flow space 144 toward the outlet openings 148.

When the inflation fluid flows from the storage chamber 18 to the air bag 12 in the foregoing manner, the flow rate developed by the fluid pressure in the storage chamber 18 prevents the combustion products that are emitted from the body 160 of combustible material from entering the storage chamber 18 to any substantial degree. Therefore, the inflation fluid is substantially heated and expanded to an increased volume by those combustion products only after the inflation fluid exits the storage chamber 18. Moreover, those combustion products heat and increase the volume of the inflation fluid to such an extent that the inflation fluid can be contained in the storage chamber 18 at a relatively low pressure level. In accordance with this feature of the present invention, the walls 26, 28 and 30 of the container 22 are substantially thinner than they would otherwise have to be if the container 22 were required to contain the inflation fluid while it is being heated. The weight of the pressure vessel 14 is proportionately less as a result of this feature of the present invention.

In accordance with another feature of the present invention, the body 160 of combustible material is sized so that it will continue to burn and emit combustion products into the inflation fluid to heat the inflation fluid throughout the time that the inflation fluid is flowing outward from the storage chamber 18. Consequently, the inflation fluid continues to be directed through the passage 170 in the body 160 of combustible material while the fluid pressure in the storage chamber 18 is decreasing as a result of the outward flow of inflation fluid. However, the passage 170 increases in diameter as the body 160 is consumed by combustion. The cross-sectional flow area of the nozzle defined by the body 160 thus increases while the fluid pressure in the storage chamber 18 decreases. Such enlargement of the nozzle counteracts the reduction in fluid pressure in the storage chamber 18 so that the flow of the inflation fluid outward from the storage chamber 18 is maintained at desirable high rates. Although the passage 170 shown in the drawings has a constant diameter along its entire length, it could alternatively have a varying diameter so as to define a control orifice or the like.

From the above description of the invention, those skilled in the art will perceive improvements, changes and modifications. For example, the diffuser 20 may not need to have the form shown in the drawings. Specifically, the diffuser 20 may simply be long enough to support the combustion arrestor 150, and need not extend along the length of the container 22 or have fluid outlet openings 148. Alternatively, the diffuser 22 may consist only of the first end wall 130, with the combustion arrestor 150 being formed as an annulus extending between the first end wall 130 and the second end wall 28 of the container 22. The manifold 24, and possibly other components or surfaces in a vehicle, would help direct inflation fluid from the pressure vessel 14 into the air bag 12. Such improvements, changes and modifications within the skill of the art are intended to be covered by the appended claims.

Having described the invention, the following is claimed:

1. Apparatus for use in inflating an inflatable vehicle occupant restraint, said apparatus comprising:

pressure vessel means for defining a closed storage chamber containing inflation fluid;

actuator means for opening said storage chamber to release said inflation fluid from said storage chamber, said actuator means including a charge of pyrotechnic material;

directing means for directing said inflation fluid from said pressure vessel means into the vehicle occupant restraint to inflate the vehicle occupant restraint; and heating means for increasing the volume of said inflation fluid at a location outside of said storage chamber by heating said inflation fluid outside of said storage chamber, said heating means including a body of combustible material which, when ignited, produces combustion products and emits said combustion products into said inflation fluid, said body of combustible material being located outside of said storage chamber between said storage chamber and the vehicle occupant restraint;

said pressure vessel means and said directing means at least partially defining an enclosed fluid flow space communicating said pressure vessel means with the vehicle occupant restraint, said apparatus further comprising combustion arrestor means for blocking the propagation of combustion, said combustion arrestor means being permeable to said inflation fluid and being located in said enclosed fluid flow space between said pressure vessel means and the vehicle occupant restraint.

2. Apparatus as defined in claim 1 wherein said inflation fluid is contained in said storage chamber at a pressure level which causes said inflation fluid to flow outward from said storage chamber when said storage chamber is opened by said actuator means, said body of combustible material, when ignited, continuing to emit said combustion products into said inflation fluid throughout the time that said inflation fluid flows outward from said storage chamber under the influence of said pressure 3. Apparatus as defined in claim 1 wherein said actuator means includes means for igniting said charge of pyrotechnic material, said charge of pyrotechnic material, when ignited, producing combustion products that ignite said body of combustible material.

4. Apparatus for use in inflating an inflatable vehicle occupant restraint, said apparatus comprising:

pressure vessel means for defining a closed storage chamber containing inflation fluid;

actuator means for opening said storage chamber to release said inflation fluid from said storage chamber, said actuator means including a charge of pyrotechnic material;

directing means for directing said inflation fluid from said pressure vessel means into the vehicle occupant restraint to inflate the vehicle occupant restraint; and heating means for increasing the volume of said inflation fluid at a location outside of said storage chamber by heating said inflation fluid outside of said storage chamber, said heating means including a body of combustible material which, when ignited, produces combustion products and emits said combustion products into said inflation fluid, said body of combustible material being located outside of said storage chamber between said storage chamber and the vehicle occupant restraint;

said pressure vessel means and said directing means at least partially defining a fluid flow path extending from said storage chamber to the vehicle occupant restraint, said body of combustible material having an ignitable surface adjoining said fluid flow path at a location between said storage chamber and the vehicle occupant restraint;

said ignitable surface of said body of combustible material defining a passage extending through said body of combustible material, said fluid flow path extending through said passage;

said pressure vessel means including a rupturable closure wall which closes said storage chamber, said actuator means including means for rupturing said closure wall to define an opening through which said inflation fluid exits said storage chamber, said passage defined by said ignitable surface of said body of combustible material having a first end adjacent to said rupturable closure wall and a second end spaced from said rupturable closure wall along said fluid flow path, whereby said body of combustible material defines a nozzle for directing sad inflation fluid from said opening.

5. Apparatus for use in inflating an inflatable vehicle occupant restraint, said apparatus comprising:

pressure vessel means for defining a closed storage chamber containing inflation fluid, said pressure vessel means including a rupturable closure wall which, when ruptured, defines an opening through which said inflation fluid exits said storage chamber to inflate the vehicle occupant restraint;

nozzle means for defining a nozzle through which said inflation fluid flows upon exiting said storage chamber through said opening, said nozzle means including a body of combustible material having a surface portion, said surface portion defining a passage which extends through said body of combustible material and through which said inflation fluid flows upon exiting said storage chamber; and actuator means for igniting said body of combustible material;

said body of combustible material, when ignited, being consumed by combustion, said passage having a cross-sectional fluid flow area which increases as said body of combustible material is consumed by combustion.

6. Apparatus as defined in claim 5 wherein said body of combustible material is located outside of said storage chamber.

7. Apparatus as defined in claim 5 wherein said passage has a first end adjacent to said rupturable closure wall and a second end spaced from said rupturable closure wall.

8. Apparatus as defined in claim 5 wherein said passage has a constant diameter.

9. Apparatus as defined in claim 5 wherein said actuator means includes opening means for opening said storage chamber to release said inflation fluid from said storage chamber, said opening means including a body of pyrotechnic material which emits combustion products when ignited, said combustion products moving against said rupturable closure wall to cause rupturing of said rupturable closure wall, said combustion products further moving against said body of combustible material to ignite of said body of combustible material.

10. Apparatus as defined in claim 9 wherein said actuator means includes means for directing said combustion products to move from said body of pyrotechnic material to said rupturable closure wall through said passage.

11. Apparatus for use in inflating an inflatable vehicle occupant restraint, said apparatus comprising:

means for defining a closed storage chamber containing inflation fluid, said means for defining a closed storage chamber including rupturable closure means for closing said storage chamber;

actuator means for rupturing said closure means to provide an outlet opening through which said inflation fluid exits said storage chamber, said actuator means including a charge of pyrotechnic material;

means for defining an outlet flow path extending from said outlet opening to the vehicle occupant restraint, said outlet flow path being located entirely outside of said storage chamber; and heating means for increasing the volume of said inflation fluid at a location outside of said storage chamber by heating said inflation fluid outside of said storage chamber, said heating means including a body of combustible material which, when ignited, produces combustion products and emits said combustion products into said outlet flow path, said body of combustible material being located outside of said storage chamber at a location in said outlet flow path.

12. Apparatus as defined in claim 11 wherein said inflation fluid is contained in said storage chamber at a pressure level which causes said inflation fluid to flow outward from said storage chamber when said storage chamber is opened by said actuator means, said body of combustible material, when ignited, continuing to emit said combustion products into said inflation fluid throughout the time that said inflation fluid flows outward from said storage chamber under the influence of said pressure.

13. Apparatus as defined in claim 11 wherein said actuator means includes means for igniting said charge of pyrotechnic material, said charge of pyrotechnic material, when ignited, producing combustion products that ignite said body of combustible material and that cause rupturing of said closure means independently of said combustion products produced by said body of combustible material.

14. Apparatus as defined in claim 11 wherein said body of combustible material comprises means for defining a nozzle having an outlet passage for directing said inflation fluid along said outlet flow path.

15. Apparatus for use in inflating an inflatable vehicle occupant restraint, said apparatus comprising:

means for defining a closed storage chamber containing inflation fluid, said means for defining a closed storage chamber including a rupturable closure wall which, when ruptured, provides an outlet opening through which said inflation fluid exits said storage chamber to inflate the vehicle occupant restraint;

a body of combustible material comprising means for defining a nozzle through which said inflation fluid flows upon exiting said storage chamber, said means for defining a nozzle including a surface portion of said body of combustible material defining a passage which extends through said body of combustible material and through which said inflation fluid flows upon exiting said storage chamber; and actuator means for igniting said body of combustible material.

16. Apparatus as defined in claim 15 wherein said means for defining a closed storage chamber blocks said inflation fluid from bypassing said passage upon exiting said storage chamber.

17. Apparatus as defined in claim 15 wherein said body of combustible material is located outside of said storage chamber.

18. Apparatus as defined in claim 15 wherein said passage has a first end adjacent to said rupturable closure wall and a second end spaced from said rupturable closure wall.

19. Apparatus as defined in claim 15 wherein said passage has a constant diameter.

20. Apparatus as defined in claim 15 wherein said actuator means includes opening means for opening said storage chamber to release said inflation fluid from said storage chamber, said opening means including a body of pyrotechnic material which emits combustion products when ignited, said combustion products moving against said rupturable closure wall to cause rupturing of said rupturable closure wall, said combustion products further moving against said body of combustible material to ignite of said body of combustible material.

22. Apparatus as defined in claim 15 wherein said combustion products emitted by said body of pyrotechnic material cause rupturing of said closure wall independently of combustion products produced by said body of combustible material.

21. Apparatus as defined in claim 20 wherein said actuator means includes means for directing said combustion products to move from said body of pyrotechnic material to said rupturable closure wall through said passage.

* * * * *